L. A. PECKHAM.
SHOCK ABSORBING DEVICE.
APPLICATION FILED DEC. 3, 1909.
986,082.
Patented Mar. 7, 1911.
2 SHEETS—SHEET 2.
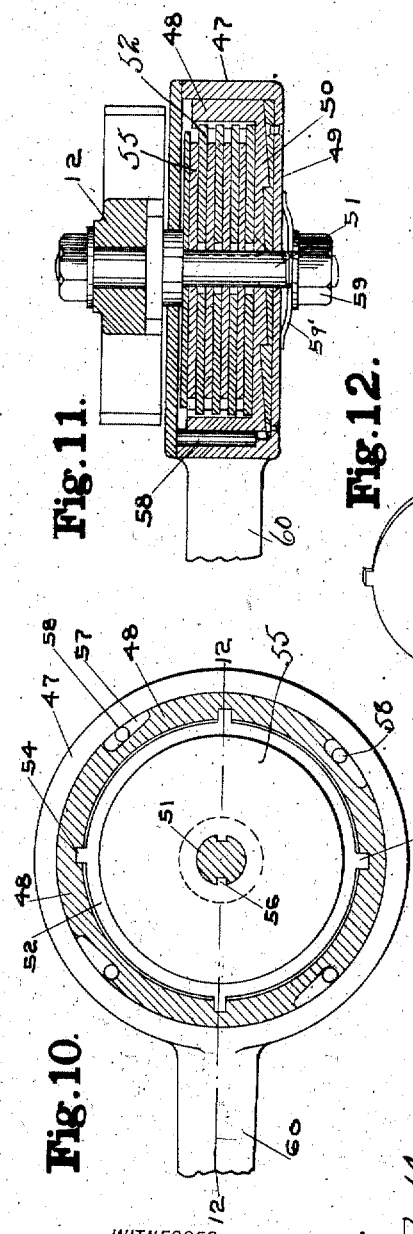
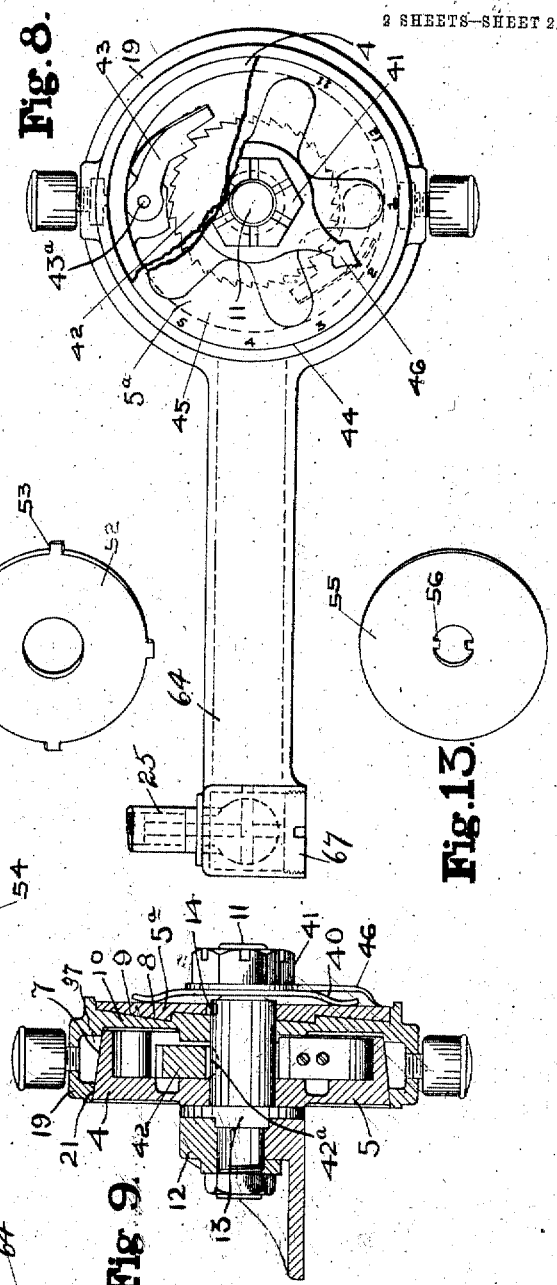
WITNESSES
Herbert L. Kelley
E. I. Ogden
INVENTOR
Luther A. Peckham
By Howard E. Barlow
ATTORNEY

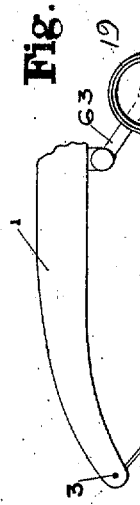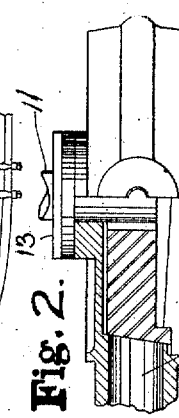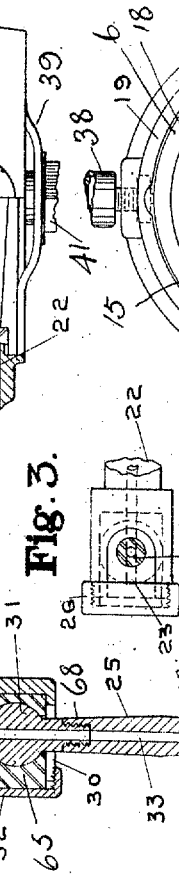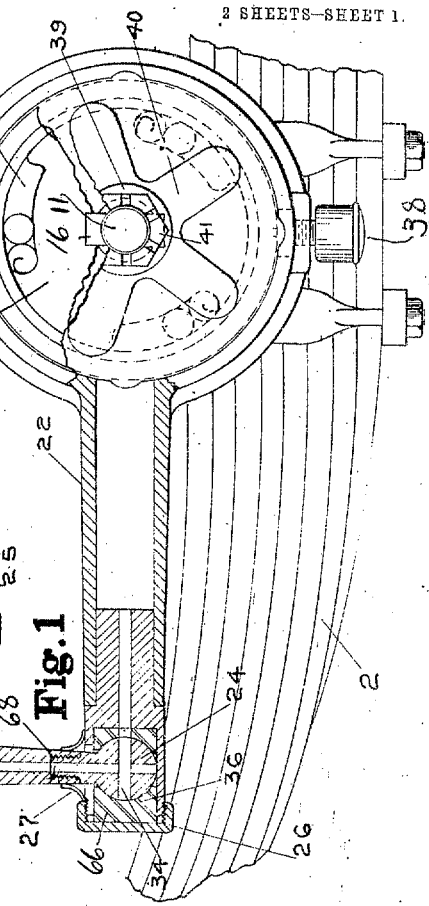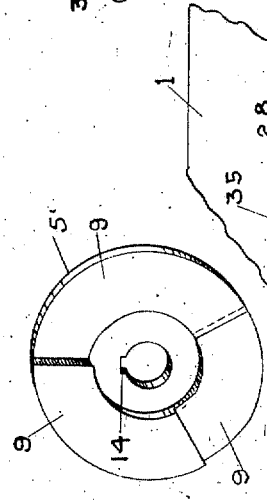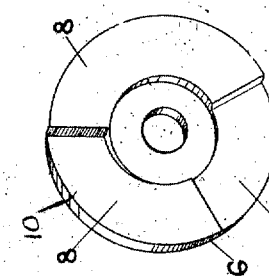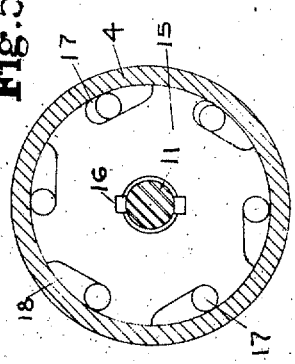

UNITED STATES PATENT OFFICE.

LUTHER A. PECKHAM, OF EDGEWOOD, RHODE ISLAND.

SHOCK-ABSORBING DEVICE.

986,082. Specification of Letters Patent. Patented Mar. 7, 1911.

Application filed December 3, 1909. Serial No. 531,140.

*To all whom it may concern:*

Be it known that I, LUTHER A. PECKHAM, citizen of the United States, residing at Edgewood, in the town of Cranston, in the county of Providence and State of Rhode Island, have invented certain new and useful Improvements in Shock-Absorbing Devices, of which the following is a specification, reference being had therein to the accompanying drawing.

This invention relates to spring controlling devices for automobiles and other vehicles, and has for its object to provide a device of simple construction to assist in absorbing the shocks and jars which are imparted to the vehicle springs, particularly while riding over rough roads, so that as these springs are being compressed the frictional resistance of the device will increase slightly and support the downward movement of the vehicle body to a limited extent, the feature of the invention being that the maximum frictional resistance is exerted on the spring when the body begins to rise, which resistance gradually diminishes, causing the body to return to its normal level without sudden recoil or rebound, thus eliminating the shocks and jars ordinarily transmitted to the passengers where the spring is free to act uncontrolled. By this construction of shock absorber I am enabled to mount the body on very light and resilient springs causing the vehicle to ride with great ease, and by providing such an auxiliary support for the springs, when they are called upon to withstand severe strains, the danger of breakage is practically eliminated.

With these and other objects in view, the invention consists of certain novel features of construction, as will be more fully described and particularly pointed out in the appended claims.

In the accompanying drawings: Figure 1— is a side elevation, partly in section, illustrating my improved shock absorber as attached to the spring and the friction band arm being connected to the frame of the vehicle. Fig. 2— is a plan view, partly in section, of the body of the device. Fig. 3—is a top view of the end of the brake band arm showing the slot through which the connection is inserted. Fig. 4— is a sectional side elevation of the drum and one form of ratchet located therein. Fig. 5— is a perspective view of the front face of the friction band plate, illustrating the plurality of inclined planes or surfaces formed thereon. Fig. 6— is the correspondingly inclined face of the outer fixed plate. Fig. 7— is a modified arrangement of mounting the stock absorber body whereby the same is suspended by two arms between the frame and the spring base. Figs. 8 and 9 show a ratchet and pawl arrangement instead of the roll clutch illustrated in Fig. 1. Fig. 10— is a partial sectional side elevation illustrating a modified form whereby a plurality of frictional disks are employed. Fig. 11— is a sectional plan view on line 12—12 of Fig 10. Figs. 12 and 13 illustrate the movable and fixed friction disks respectively. Fig. 14— is a top view of the outer end of the band arm 64 illustrated in Fig 8, showing the opening through which the connecting rod 25 is adapted to work.

Referring to the drawings, the device embodying the present invention is shown as applied to an automobile, 1 designating a portion of the frame or chassis thereof, and 2 a portion of one of the springs which is secured to the vehicle axle in a manner not shown, the spring being preferably directly connected at one end 3 to the frame, see Fig. 7, the opposite end being connected by a link or other suitable means, not shown.

The shock absorbing device comprising essentially a body portion 4 is preferably made in the form of a circular drum which, as illustrated in Fig. 9, is rotatably supported direct from the stud 11 by means of the plate 5. This drum is provided with a tapering frictional engaging surface 7 on which the friction band 19 is mounted, the inner surface of said band being correspondingly tapered at 21. This band also has a plate 10 integral with or otherwise secured to it and extending downward substantially to the pivot stud 11. The face of this plate is provided with a series of segmental stepped-in or inclined surfaces 8. An independent plate 5ª is also provided with segmental inclined surfaces 9 corresponding to and adapted to register with those on the face of plate 10. This plate 5ª is keyed at 14 to the stud 11 so that it is held against rotation but may receive a slight endwise motion on said stud. This plate 5ª is yieldably pressed against plate 10 by means of the spring 40 which spring is adjustably held in position by the nut 41. The projection 13 on stud 11 fits into a corresponding socket in bracket 12 to prevent rotation of said stud. A ratchet wheel 42 is keyed at 42ᵃ to the stud and a pawl 43 is pivoted at 43ᵃ to the drum 4 so that said drum is permitted to rotate in but one direction.

In operating a device thus constructed it will be seen that as the arm 64 descends, due to the compression of the vehicle springs, the drum 4 is rotated to the left (looking at Fig. 8). The cams on the face of plate 10 (which is also rotated) ride up on the corresponding cams on the face of plate 5ᵃ (Fig. 9) causing the latter plate to move laterally on its key 14 against the spring 40, the increased tension on said spring setting the inclined surfaces of the friction band and drum harder together. The only resistance to this downward stroke is the riding of the cam faces on plate 10 up onto the cam faces of plate 5ᵃ thereby causing an increased friction against rotation due to the increased tension on spring 40. When the vehicle springs re-act the arm 64 commences to ascend, the pawl 43 preventing the backward motion of the drum and the band is therefore obliged to work on the inclined surface thereof, the maximum resistance being exerted at the commencement of this upward stroke due to the extra tension of the spring 40 through the cam plate 5ᵃ forcing the inclined surface together. As the arm now rises the resistance is gradually decreased until when in its normal position the friction between the band and its drum is at its minimum.

By the above it will be seen that there is a slight resistance to the downward stroke but that the maximum resistance is applied at the very beginning of the upward stroke and diminishes gradually until the normal position is reached, which varying resistance is produced through the action of the co-operating segmental cam faces on plates 5ᵃ and 10. This varying resistance is only incidental so far as the cam plates 10 and 5ᵃ are concerned, the real resistance being produced by the co-action of inclined surfaces 7 and 21; that is, between the drum and the friction band, because the relationship of these latter two members is varied according to the relative positions of the cam plates 5ᵃ and 10.

It is to be understood that the object of my invention does not include any intention or desire to present any resistance to downward movement of the vehicle body, but to retard upward movement. My improved device is so constructed that the lower the point to which the vehicle body moves the greater will be the resistance to the upward movement at the beginning thereof, that resistance gradually decreasing as the vehicle body reaches its normal position.

While the structure illustrated in Figs. 8 and 9 shows the clutch mechanism as including pawls, it is to be understood that instead of pawls the type of roller clutch illustrated in Figs 1 and 4 could be and preferably is employed. Said clutch comprises a disk member 15 mounted on and fixed to the stud 11, preferably by means of a key 16, rolls 17 being mounted in suitable tapering recesses 18 in the disk, the said rolls being adapted to bite in the usual manner against the inner wall of the drum 4.

The friction band 19 may be provided with an outwardly extending hollow arm 22 as shown in Fig. 3 for retaining grease or other lubricant, said arm being slotted at 23 at its outer end for the reception of the ball end 24 of the connecting rod 25. A cap 26 is adapted to be screwed on to this outer end to retain the connection in position. A thin flexible cover 27 of leather or other suitable material may be placed over the aperture to exclude dirt or other foreign matter. A bracket 28 attached to the frame 1, is also provided with a grease retaining chamber 29 slotted at its lower portion at 30 to admit the ball end 31 of connection 25. Both of these chambers are also provided with suitable thrust blocks 65 and 66 in which the ball heads receive their bearings. A cap 32 is adapted to screw on to this member 29 to retain the connection in position.

A feature of this particular construction is that the connecting rod is provided with a channel 33 throughout its length and another at 34 longitudinally through its lower ball end 24, whereby in addition to lubricating the upper ball head bearing by means of the grease cup 35 grease may also be forced through said connecting rod into chamber 36 to lubricate the lower bearing, thence through the hollow arm 22 into the connecting annular grease retaining chamber 37, if desired, although lubrication may be supplied to this latter chamber and also through the hollow arm to the chamber 36 by means of the grease cups 38 if desired. I do not wish to be restricted to inserting these blocks from the side of the bearing as the same may be inserted from the end of said bearings, see Fig. 8, in which case I would provide a nut 67 for retaining the friction blocks in position, and the ball ends of the connecting rod 25 would be attached to the rod proper by means of screws 68, as illustrated in Fig. 1, to facilitate the positioning of the same. It is also found convenient in practice to graduate as at 44 the outer face 45 of the plate 5ᵃ and to attach a finger or pointer 46 to the nut 41 by which to indicate the tension so that each of a set of these devices may be uniformly adjusted.

In the construction of my improved device I do not restrict myself to obtaining the frictional resistance by contact of the friction band with the periphery of the drum, as this friction may be obtained by other means. One practical construction for obtaining this result is the employment of a plurality of contacting friction disks, as illustrated in Figs. 10 and 13 inclusive, in which 47 designates the outer friction band and 48 the drum, both of which are rotatably mounted through their plates 49 and 50, respectively, on the central stud 51. The series of disks 52, see Figs. 11 and 12, are preferably provided with a plurality of outwardly extending keys 53 adapted to fit into corresponding key ways 54 in the interior of said drum 48. These disks are mounted within said drum and arranged alternately with another set of disks 55, each of the latter being provided with inwardly turned keys 56 adapted to engage corresponding grooves in the stud 51.

In order to arrange the drum so that it will be actuated in but one direction upon the reciprocating motion of the friction band I have formed the periphery of said drum into a roller clutch by providing therein a plurality of slots 57, in which rolls 58 are loosely mounted to operate similar to a ratchet to automatically connect the drum with the band as the vehicle body rises.

In order to regulate and control the amount of frictional resistance so that the maximum will be exerted as the vehicle body starts to rise from its lowest position, the plate 50 of the drum 48 and the plate 49 of the band 47, are each supplied with a series of co-acting inclined surfaces similar to those illustrated in Figs. 5 and 6; the nut 59 through the spring 59' serving to prevent an outward lateral motion of the plate 49 of the friction band on the stud 51. By this construction each downward motion of the band arm 60 serves to slide the inclined planes on the inner surface of plate 49 of said band over those of the corresponding surface of plate 50 on the drum, moving said drum laterally inward on the stud 51 and crowding the frictional surfaces of the respective plates together, the greater the downward stroke the greater the frictional pressure on said plates, which pressure is gradually removed as the vehicle body returns toward its normal level. In Figs. 1 to 9 inclusive the structure is such that the friction drum member is free to move together with the band as the body descends and the vehicle springs are compressed, frictional action between said band and drum taking place only on the upward movement of the body and this frictional resistance diminishing from its maximum, at the beginning of such upward movement, to the normal position of the parts.

My improved shock absorber may be attached to an automobile or other vehicle in the manner illustrated in Fig. 1, if desired, or its position may be reversed having the body portion carried on the vehicle frame and the arm connected to the spring, or the body portion may be suspended between the axle and the frame, as illustrated in Fig. 7, from a bracket 61 on the arm 62, the stud portion supporting the ratchet in this case being connected to the chassis through the arm 63 in which position the operation of the device would be similar as when mounted in the manner illustrated in Fig. 1.

By my improved construction these devices may be readily attached to an automobile or other vehicle, where ordinarily there are four employed, one to act in conjunction with each spring. By the employment of the tension indicating mechanism the extent of adjustment may be visibly indicated by the pointer thereby readily enabling each of the set to be adjusted to operate under a given tension and by the employment of a clutch or ratchet the drum portion is caused to rotate intermittently or at each downward stroke of the friction band, thereby equally distributing the wear around its working surface.

An important feature of my improved construction is the employment of co-acting surfaces having inclined planes or cam-shaped faces whereby my improved shock absorbing device is adapted to automatically set the frictional surfaces more tightly together during its downward stroke, whereby the greatest frictional resistance will act on the vehicle spring when most compressed or in position to exert its greatest power, and also to release the spring and permit the same to act with its minimum resistance while in its raised or normal position, but I do not wish to be restricted to the particular construction shown and described of inclined planes or surfaces for this purpose, as any arrangement of helix, screw or cam may be employed to accomplish this result without departing from the spirit and scope of my invention.

Having thus described my invention, what I claim is—

1. A shock absorber having two coöperating friction members, means for connecting them respectively to two relatively movable parts of a vehicle, means for varying the frictional engagement of said members, and clutch mechanism for permitting a relatively free movement of the vehicle body in one direction and for presenting a gradually decreasing frictional resistance to movement of the body in the return direction.

2. In a shock absorber for vehicles, a rotatable member, a friction band engaging the periphery of said member, clutch devices for controlling the movement of said member, and means for automatically decreasing the frictional resistance between said member and band as the vehicle body rises, the clutch devices permitting a relatively free downward movement of said body, as set forth.

3. In a shock absorber for vehicles, a rotatable member, a friction band engaging the periphery of said member, clutch devices for controlling the movement of said member, and one or more cams for automatically decreasing the frictional resistance between said member and said band as the vehicle body rises, the clutch devices permitting a relatively free downward movement of said body, as set forth.

4. A shock absorber for vehicles comprising a rotatable drum, clutch devices within said drum for controlling its frictional resistance against rotation, a band engaging said drum, said band and said drum constituting two coöperating frictional elements, the former being connected to the spring supported vehicle body and the latter supported from the base, said clutch devices permitting said drum to turn only as the body descends, and means for causing gradually decreasing frictional resistance on the drum as the body rises.

5. A shock absorber for vehicles comprising a rotatable drum, clutch devices within said drum for varying its frictional resistance against rotation, a band around said drum, said clutch devices and said band being connected respectively to different relatively movable parts of the vehicle, said clutch devices intermittently connecting said drum to its operative movable part of the vehicle, to move the drum as the vehicle body vibrates vertically on its springs, and means for gradually diminishing the frictional resistance of the frictional means as the springs withdraw from their depressed position.

6. A shock absorber for vehicles comprising a rotatable drum, two co-acting friction members, a band around said drum, one of said friction members and said band being attached respectively to different relatively movable parts of the vehicle, clutch devices for intermittently operating the drum as the vehicle body vibrates vertically on its springs, and means for gradually diminishing the frictional resistance of said friction members as the springs withdraw from their depressed position.

7. A shock absorber for vehicles comprising a rotatable drum, two co-acting friction members, a band around said drum, one of said friction members and said band being attached respectively to different relatively movable parts of the vehicle, clutch devices for intermittently operating the drum as the vehicle body vibrates vertically on its springs, the mechanism including one or more cams for gradually increasing the bind of said friction members as the vehicle body descends, said cams being also arranged to gradually diminish the frictional resistance of said members as the body rises.

8. In a shock absorber for vehicles, a rotatable member having a bevel peripheral face, a friction band engaging the periphery of said member, clutch devices for controlling the movement of said member, means for automatically permitting said member and band to withdraw from each other whereby the frictional resistance between them is decreased as the vehicle body rises, said clutch devices permitting a relatively free downward movement of said body, as set forth.

9. In a shock absorber for vehicles, a rotatable member having a bevel peripheral face, a friction band engaging the periphery of said member, clutch devices for controlling the movement of said member, one or more cams for automatically permitting said member and band to withdraw from each other whereby the frictional resistance between them is decreased as the vehicle body rises, said clutch devices permitting a relatively free downward movement of said body, as set forth.

In testimony whereof I affix my signature in presence of two witnesses.

LUTHER A. PECKHAM.

Witnesses:
HOWARD E. BARLOW,
E. I. OGDEN.